United States Patent
Völkel

(10) Patent No.: US 9,553,441 B2
(45) Date of Patent: Jan. 24, 2017

(54) METHOD AND APPARATUS FOR PROTECTING AN INTERMEDIATE CIRCUIT CAPACITOR IN A POWER CONVERTER

(71) Applicant: Siemens Aktiengesellschaft, München (DE)

(72) Inventor: Stefan Völkel, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 236 days.

(21) Appl. No.: 14/366,556

(22) PCT Filed: Nov. 16, 2012

(86) PCT No.: PCT/EP2012/072857
§ 371 (c)(1),
(2) Date: Jun. 18, 2014

(87) PCT Pub. No.: WO2013/092045
PCT Pub. Date: Jun. 27, 2013

(65) Prior Publication Data
US 2014/0321019 A1    Oct. 30, 2014

(30) Foreign Application Priority Data

Dec. 19, 2011  (EP) .................................... 11194195

(51) Int. Cl.
*H02H 3/00* (2006.01)
*H02H 3/20* (2006.01)
(Continued)

(52) U.S. Cl.
CPC ................. *H02H 3/20* (2013.01); *H02H 7/16* (2013.01); *H02M 1/32* (2013.01); *H02M 7/49* (2013.01);
(Continued)

(58) Field of Classification Search
CPC .................................. H02H 3/00; H02H 7/16
(Continued)

(56) References Cited

U.S. PATENT DOCUMENTS

| | | | |
|---|---|---|---|
| 6,320,767 B1 | 11/2001 | Shimoura et al. | |
| 8,008,923 B2* | 8/2011 | Hammond | H01M 10/44 320/116 |
| 2011/0235221 A1 | 9/2011 | Vögeli | |

FOREIGN PATENT DOCUMENTS

| | | |
|---|---|---|
| CN | 101816120 A | 8/2010 |
| EP | 2 369 725 A1 | 9/2011 |

OTHER PUBLICATIONS

Lambertz Lukas et al; "Modularer, Hochfrequenz Umrichter Für Fahrzeugantriebe" (Modular high-frequency converter for vehicle propulsion); Institute for Powerelectronics, University of the German Federal Armed Forces, Munich) VDE Verlag; EMA Conference Sep. 8-9, 2010 in Aschaffenburg; pp. 47-53;ISBN 978-3-8007-3311-8; XP009163159; 2010; DE; Sep. 8, 2010.
(Continued)

*Primary Examiner* — Dharti Patel
(74) *Attorney, Agent, or Firm* — Henry M. Feiereisen LLC.

(57) ABSTRACT

A method for protecting an intermediate circuit capacitor in a power converter circuit is disclosed. The power converter circuit includes at least two submodules in a series circuit, which draws electrical power from a power source outputting a DC voltage via an inductance, wherein each submodule has, on the input side, a single-phase half bridge and, on the load side, a single-phase full bridge, and wherein the half bridge, the full bridge and an intermediate circuit capacitor are connected in parallel with one another on the DC voltage side. When a fault in one of the submodules is detected, transmission of electrical power from the load-side output of
(Continued)

the full bridge of the submodule with the detected fault into the submodule with the detected fault is blocked.

18 Claims, 2 Drawing Sheets

(51) Int. Cl.
    *H02M 7/49*         (2007.01)
    *H02M 1/32*         (2007.01)
    *H02H 7/16*         (2006.01)
    *H02H 7/122*       (2006.01)
    *H02M 7/483*       (2007.01)

(52) U.S. Cl.
    CPC ...... *H02H 7/122* (2013.01); *H02M 2007/4835* (2013.01)

(58) Field of Classification Search
    USPC ........................................................ 361/91.1
    See application file for complete search history.

(56) References Cited

OTHER PUBLICATIONS

Lambertz L. et al; "Modular converter systems for vehicle applications"; Emobility—Electrical Power Train, 2010, IEEE, Piscataway, NJ; pp. 1-6; ISBN: 978-1-4244-8410-2; XP031835669; 2010; US; Nov. 8, 2010.

\* cited by examiner

METHOD AND APPARATUS FOR PROTECTING AN INTERMEDIATE CIRCUIT CAPACITOR IN A POWER CONVERTER

CROSS-REFERENCES TO RELATED APPLICATIONS

This application is the U.S. National Stage of International Application No. PCT/EP2012/072857, filed Nov. 16, 2012, which designated the United States and has been published as International Publication No. WO 2013/092045 and which claims the priority of European Patent Application, Serial No. 11194195.1, filed Dec. 19, 2011, pursuant to 35 U.S.C. 119(a)-(d).

BACKGROUND OF THE INVENTION

The invention relates to a method for protecting an intermediate circuit capacitor in a power converter circuit having at least two submodules connected in a series circuit and receiving via an inductance electrical power from a DC voltage side of a power source, a control device for executing the method, a power converter circuit having the control device, and an electric motor having the power converter circuit.

A power converter circuit for supplying electrical power to the motor windings of an electric motor in a vehicle drive system is known for example from the publication Lukas Lamberts et al, "Modularer Hochfrequenz Umrichter für Fahrzeugantriebe" (modular high-frequency converter for vehicle drive systems), EMA 2010, 8 to 9 Sep. 2010, Aschaffenburg.

The circuit in question is one which is intended for converting a DC voltage from an electrical power source into a plurality of AC voltages. The individual AC voltages are generated by submodules connected in series, at the input side of each of which a part of the DC voltage drops. Within the submodules the corresponding part of the DC voltage is in each case converted by way of a single-phase full bridge operating as an inverter into an AC voltage which can be delivered to one of the motor windings. The single-phase full bridge comprises two single-phase half bridges, each of which is provided for generating an AC voltage phase, which means that the two AC voltage phases in total yield a single-phase AC voltage.

The partial voltages dropping at the inputs of the individual submodules are increased prior to the inversion by the full bridge by means of a boost converter. The boost converter comprises an inductance, which is connected in series between the electrical power source and the series circuit of the full bridges, and also an input half bridge in each submodule. The full bridge and the half bridge are connected on the DC voltage side within the submodule.

Connected in parallel with the full bridge and with the input half bridge in each submodule is an intermediate circuit capacitor which can store electrical energy, for example from a reactive power flow from the motor windings.

EP 2 369 725 A1 discloses a bridging unit having a bistable relay for converter cells connected in series. By means of the relay, in the case of an excess current and/or an excess voltage, but also if an external closure signal is present, the inputs of the respective converter cell are short-circuited and a low-impedance conduction path for bridging the converter cell is thereby made available. In this case an electric current present at the inputs flows by way of the bridging unit and not through other structural components of the converter cell. A semiconductor switch can be switched in parallel with the relay in order to shorten the response time of the bridging unit.

SUMMARY OF THE INVENTION

The object of the invention is to improve the known power converter circuit.

According to one aspect of the invention, a method for protecting an intermediate circuit capacitor in a power converter circuit having at least two submodules connected in a series circuit and receiving via an inductance electrical power from a DC voltage side of a power source, wherein each submodule has on an input side a single-phase half bridge and on a load side a full bridge and wherein the half bridge, the full bridge and an intermediate circuit capacitor are connected in parallel with one another on the DC voltage side, includes detecting a fault in one of the submodules, and disabling a power flow at the output of a submodule of a power converter circuit in the event of a fault.

The invention is based on the consideration that a power converter circuit draws electrical power from an electrical power source with a main power flow direction. The invention recognizes however that said main power flow direction cannot readily be reversed in the individual submodules of the power converter circuit. The voltage from the electrical power source is predetermined and therefore drops with a defined sign at the submodules. In order to set a particular power to be drawn by an electrical consumer load connected to the power converter circuit a corresponding regulating circuit can therefore only regulate the current from the power source. Since the current from the electrical power source however flows in equal measure through all the submodules of the power converter circuit on account of their connection in series, the direction of the current and thus the individual power flow direction through each submodule cannot be set at will. If however in the event of a fault a first load at a first submodule draws electrical power and at the same time a second load at a second submodule outputs electrical power, electrical power must be stored in one of the two submodules because electrical power is delivered to one of the two submodules from both sides—input and output.

The invention is furthermore based on the consideration that said storage is possible only to a limited extent and is dependent on the capacitance of the intermediate circuit capacitor in the submodule. In order to save installation space and costs the capacitance of the intermediate circuit capacitor should be dimensioned as small as possible. This is however in contradiction to the aforementioned problem that in the event of a fault power needs to be stored in one of the submodules if electrical power is delivered to an input and an output of the submodule.

The invention therefore proposes disabling an electrical power flow out of the electrical load into the faulty submodule in the event of a fault.

The invention therefore specifies a method for protecting an intermediate circuit capacitor in a power converter circuit comprising at least two submodules in a series circuit, which draws electrical power from a power source outputting a DC voltage by way of an inductance, wherein each submodule has, on the input side, a single-phase half bridge and, on the load side, a single-phase full bridge, and wherein the half bridge, the full bridge and an intermediate circuit capacitor are connected in parallel with one another on the DC voltage side. According to the invention, the method comprises the steps of detecting a fault in one of the submodules and blocking an electrical power transmission from the load-side output of the full bridge of the submodule with the detected fault into the submodule with the detected fault. The full bridge is alternatively multi-phase if for example a correspondingly multi-phase consumer load is to be connected to the submodule. The full bridge can thus for example be three-phase if a normal asynchronous motor is connected as the load.

By means of the specified method it is possible in the event of a fault in a submodule of a power converter circuit when electrical power is delivered to the submodule by way of an input and an output simultaneously to prevent excessive electrical energy being delivered to an intermediate circuit capacitor in the submodule. This means that it is possible to save not only costs and installation space for the submodule and thus for the power converter circuit, but excessive charging of the intermediate circuit capacitor and the possible destruction associated therewith of the intermediate circuit capacitor can likewise be avoided, which means that serious physical damage to the power converter circuit in the event of a fault can likewise be avoided.

In a development of the invention, the specified method comprises the step of interrupting the electrical connection between a load-side output of the full bridge of the faulty submodule and the intermediate circuit capacitor of the faulty submodule in order to separate the load-side output of the full bridge of the faulty submodule from the intermediate circuit capacitor of the faulty submodule. As a result of the interruption an output of electrical energy to an electrical load connected to the faulty submodule is disabled, which means that in the event of a fault it is also not possible for any further electrical energy to be output by the electrical load into the faulty submodule. In this manner, an uncontrolled feeding of currents from the electrical load into the full bridge of the faulty submodule is avoided. Said currents could be rectified by way of free-wheeling diodes of the full bridge of the faulty submodule and charge up the intermediate circuit capacitor of the faulty submodule in an uncontrolled fashion.

By particular preference, the interruption of the electrical connection between a load-side output of the full bridge of the faulty submodule and the intermediate circuit capacitor of the faulty submodule takes place by way of a switch arranged in the load-side output of the full bridge of the faulty submodule, which switch can be connected in series with an electrical load connected to the faulty module, such that the blocking of the electrical power transmission into the faulty submodule can be protected by means of a redundant switching element.

In an additional development of the invention, the specified method comprises the step of short-circuiting the load-side output of the full bridge of the faulty submodule in order to separate the load-side output of the full bridge of the faulty submodule from the intermediate circuit capacitor of the faulty submodule. As a result of short-circuiting the load-side output an additional current path is introduced between the terminals of the electrical load connected to the faulty submodule. Said current path lies parallel to the intermediate circuit capacitor of the faulty submodule. The lower the impedance of the current path, the more current from the connected electrical load bypasses the intermediate circuit capacitor of the faulty submodule by way of said current path, which means that charging of the intermediate circuit capacitor of the faulty submodule by this current is avoided.

In a preferred development of the invention, in order to short-circuit the load-side output of the full bridge of the faulty submodule the specified method comprises the step of closing two switches of the full bridge of the faulty submodule, which switches connect the output with the intermediate circuit capacitor. The short-circuit is thereby routed by way of the bridge arms of the full bridge of the faulty submodule, which means that the faulty submodule of the power converter circuit of the type mentioned in the introduction does not need to be changed further in terms of circuitry in order to execute the specified method.

In a particularly preferred development of the invention the specified method comprises the step of closing a switch connected in parallel with the load-side output of the full bridge of the faulty submodule in order to short-circuit the load-side output of the full bridge of the faulty submodule. A short-circuit of the load-side output of the full bridge of the faulty submodule could as already mentioned in fact also be implemented by way of the bridge arms within the full bridge, but if the cause of the fault which results in blocking of the electrical power transmission lies in the full bridge itself, a short-circuit might where applicable no longer be possible. This problem is avoided by the closure of the switch connected in redundant fashion in parallel to the load-side output of the full bridge.

In a further development of the invention the specified method comprises the step of separating an input of the faulty submodule from the intermediate circuit capacitor of the faulty submodule. In this manner, a charging of the intermediate circuit capacitor of the faulty submodule due to an input-side power flow, which can no longer leave the faulty submodule due to blocking of the power flow at the load-side output of the full bridge, is avoided. The separation of the input of the faulty submodule from the intermediate circuit capacitor of the faulty submodule can be carried out by means of the same method steps which have also been specified for blocking the electrical power transmission from the load-side output of the full bridge of the faulty submodule into the faulty submodule.

In a particularly preferred development of the invention the method consists in short-circuiting the input of the submodule in order to separate the input of the faulty submodule and the intermediate circuit capacitor of the faulty submodule. As a result of short-circuiting the input of the faulty submodule, not only is a delivery of electrical power in the event of a fault into the submodule effectively disabled but at the same time the faulty submodule in the abovementioned series circuit comprising the plurality of submodules of the power converter circuit of the type mentioned in the introduction is also bridged, which means that a failure of the faulty submodule does not result in a total failure of the power converter circuit.

In yet a further development of the invention the specified method comprises the step of detecting the fault in the submodule when a voltage dropping at the intermediate circuit capacitor of the faulty submodule exceeds a predetermined value. As a result of comparing the intermediate circuit capacitor voltage with the predetermined value the fault in the submodule can be readily detected because a faulty power flow through the submodule can be detected directly from the level of the intermediate circuit capacitor voltage. In order where applicable to provide spare capacity for responding to the fault the predetermined value should not be set at the maximum voltage which can be applied to the intermediate circuit capacitor but to a sufficiently lower value below said maximum in order that a possible time delay between the detection of the fault and the abovementioned blocking of the electrical power transmission from the load-side output of the full bridge of the faulty submodule into the faulty submodule does not result in damage to the intermediate circuit capacitor of the faulty element and/or other elements in the faulty submodule.

The invention also specifies a control device for executing a specified method.

In a particularly preferred development of the invention the control device has a memory and a processor. In this situation the method is stored in the form of a computer program in the memory and the processor is provided for executing the specified method when the computer program is loaded from the memory into the processor.

The invention also specifies a power converter circuit which comprises at least two submodules in a series circuit and which draws electrical power by way of an inductance from a power source outputting a DC voltage. In this situation, each submodule has, on the input side, a single-phase half bridge and, on the load side, a full bridge, in particular a single-phase full bridge. The half bridge, the full bridge and an intermediate circuit capacitor are connected in parallel with one another on the DC voltage side. The specified power converter circuit comprises a specified control device.

In a development the power converter circuit comprises a switch in each submodule, which is connected at the load-side output of the full bridge in series with the full bridge.

In an alternative or additional development the power converter circuit comprises a switch in each submodule, which is connected at the load-side output of the full bridge in parallel with the full bridge.

The invention also specifies a vehicle which comprises a battery for outputting electrical power in order to drive the vehicle, a specified modular converter and an electric motor having a number of motor windings corresponding to the number of submodules, wherein each motor winding is connected as an electrical load to one of the submodules.

BRIEF DESCRIPTION OF THE DRAWING

The properties, features and advantages of this invention described above and also the manner in which they are achieved will become more clearly and obviously understandable in conjunction with the following description of the exemplary embodiments which are explained in detail with reference to the drawings. In the drawings.

Figure 1:
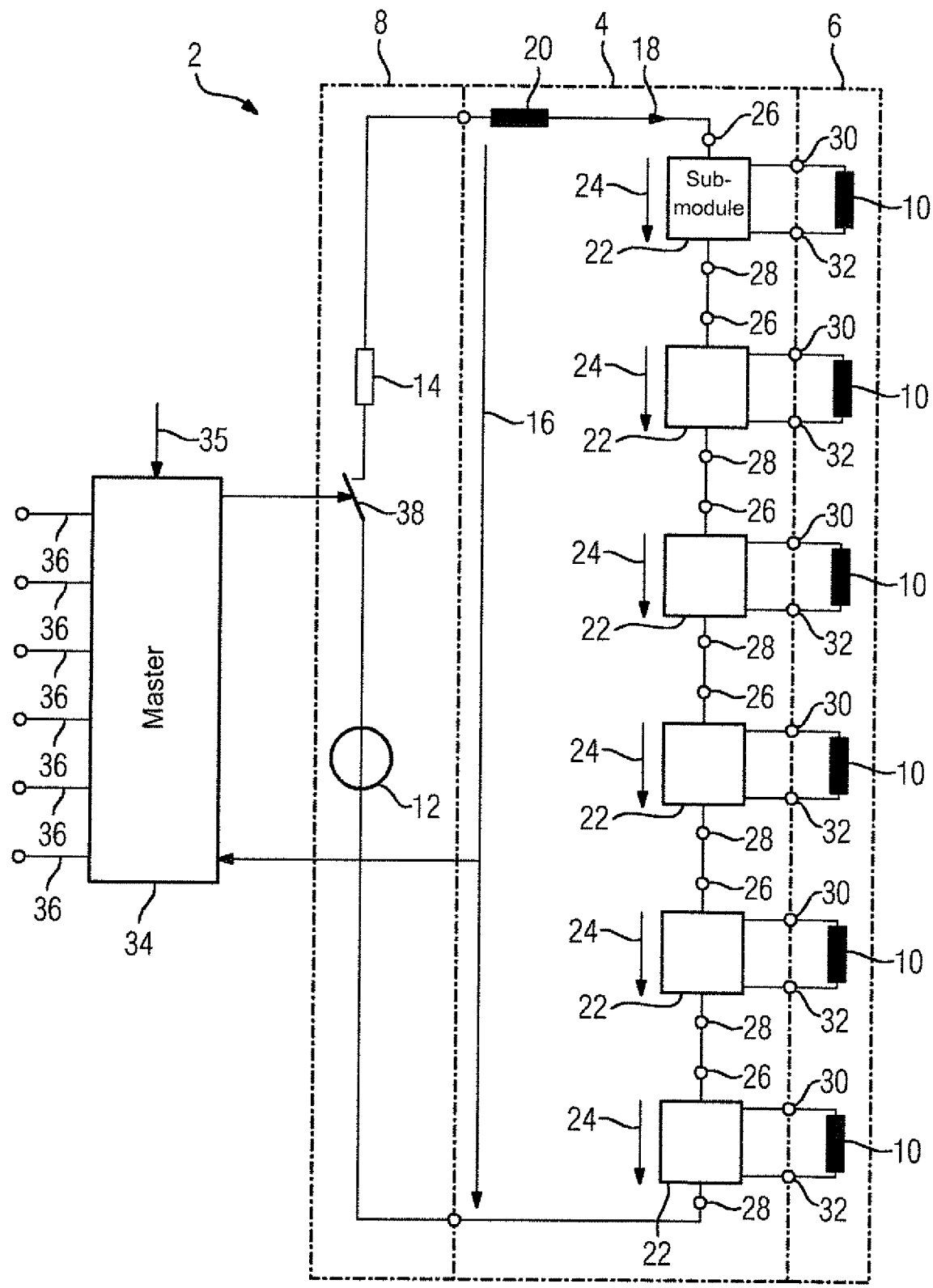
FIG. 1 shows a circuit having an exemplary modular converter.

Reference is made to FIG. 1 which shows a circuit 2 having an exemplary power converter circuit 4. The power converter circuit 4 feeds an electrical consumer load 6 with electrical power from an electrical power source 8.

DETAILED DESCRIPTION OF PREFERRED EMBODIMENTS

The electrical consumer load 6 is formed in the present embodiment as an electric motor of a vehicle and has six electrical loads 10, wherein each electrical load 10 constitutes a motor winding of the electric motor.

In the present embodiment the electrical power source 8 is a battery 8 which can be broken down into a voltage source 12 with an internal resistance 14 connected in series therewith. The battery 8 applies a battery voltage 16, to the power converter circuit 4 and outputs a battery current 18 to the power converter circuit 4.

The power converter circuit 4 has on the input side an inductance 20 which can for example be a coil. Connected in series to said inductance 20 is a series circuit consisting of six submodules 22 yet to be described. A partial voltage 24 drops in each case at the individual submodules 22. In addition, an electrical load 10 is connected in each case to each submodule 22. On the basis of the partial voltages 24, in this manner the submodules 22 supply the loads 10 with electrical energy in a manner yet to be described. Six was chosen for the number of submodules 22 and electrical loads 10 in the present embodiment. The power converter circuit 4 can however have as high a number of submodules 22 as desired and thus feed as high a number of electrical loads 10 as desired. However, the more submodules 22 are connected in the series circuit, the lower are the corresponding partial voltages 24.

Each submodule 22 has a first input terminal 26, a second input terminal 28, a first output terminal 30 and a second output terminal 32. While the partial voltages 24 drop across the first and second input terminals 26, 28 in each case, the loads 10 are connected to the first and second output terminals 30, 32.

The circuit 2 furthermore has a superordinate control device, referred to as master 34 in the following, which controls the generation of the rotating field by means of the electrical loads 10 formed as motor windings in the electrical consumer load 6 formed as an electric motor. To this end, the master 34 can receive a rotational speed 35 of the electrical consumer load 6 formed as an electric motor and actuate the individual submodules 22 on the basis of control signals 36. On the basis of the control signals 36 the individual submodules 22 adjust an electric current 60, shown in FIG. 2, through the electrical loads 10 formed as motor windings in order to generate the rotating field by means of the motor windings.

The master 34 is furthermore intended for detecting the battery voltage 16. The master 34 uses the battery voltage 16 for checking the circuit 2 for faults. If the battery voltage 16 is for example too low, this is an indication of a short-circuit. In the event of a fault the master 34 places the circuit 2 in a safe state by opening a switch 38 which for example can be arranged internally in the battery 8.

Figure 2:
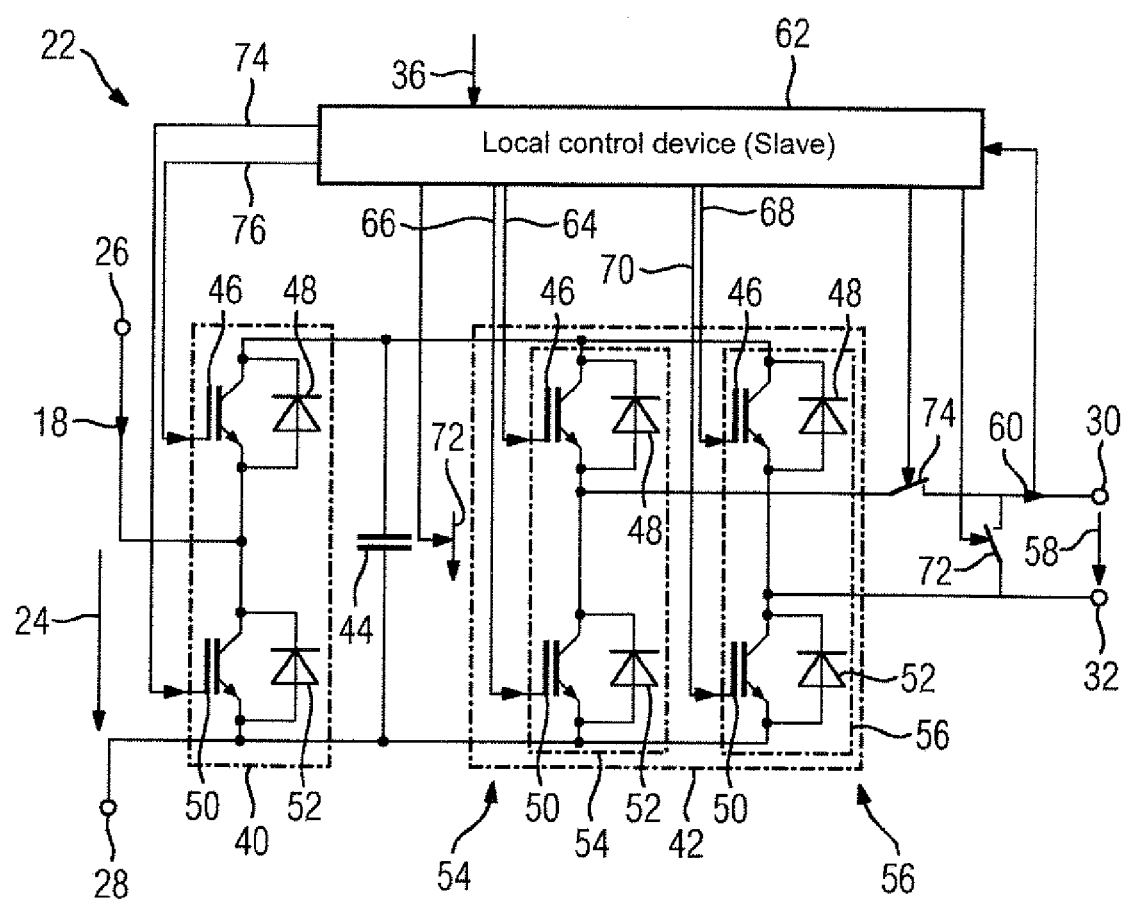
FIG. 2 shows an exemplary submodule of the modular converter.

Reference is made to FIG. 2 which shows by way of example the structure of one of the submodules 22 in the power converter circuit 4 according to FIG. 1. In FIG. 2, the same elements as in FIG. 1 are identified by the same reference characters and not described again.

The submodule 22 has an input half bridge 40, a full bridge 42 and an intermediate circuit capacitor 44, which are connected in parallel with one another.

The input half bridge 40 has a first switch 46 and a first free-wheeling diode 48 connected in parallel therewith, and also a second switch 50 connected in series therewith and a second free-wheeling diode 52 connected in antiparallel therewith. The switches can be formed as power semiconductor switches, such as for example MOSFETs (metal-oxide-semiconductor field-effect transistor). Depending on the type of the power semiconductor switch, the free-wheeling diodes 48, 52 can also be omitted.

The first partial voltage 24 is applied to the second switch 50, while the first switch 46 is connected in series between the second switch 50 and the full bridge 42. Thus from the perspective of the full bridge 42 the second switch 50 can short-circuit the input from the battery 8 while the first switch 46 (with the second switch 50 open) can place the full bridge 42 into the current path of the battery 8. If in each submodule 22 the switches 46, 50 are alternately opened and closed in the same manner, together with the inductance 20 a boost converter is created which elevates the sum of the partial voltages 24 to a level higher than the battery voltage 16. Furthermore, by means of the input half bridge 40 the full bridge 42 can also be permanently removed from the series circuit of the three submodules 22 if the second switch 50 remains permanently closed.

The full bridge 42 is designed as an H-bridge which has a first half-bridge inverter 54 and a second half-bridge inverter 56. Both half-bridge inverters 54, 56 are constructed in similar fashion to the input half bridge 40, wherein however all the free-wheeling diodes 48, 52 are connected in antiparallel to the switches 46, 50 in order to implement the H-bridge. For the sake of clarity, extra referencing is dispensed with in FIG. 2. The partial voltage 24, which is stabilized by way of the intermediate circuit capacitor 44, can be converted into an AC voltage 58 by means of suitable actuation of the full bridge 42. The AC voltage 58 is applied to the load 10 and produces a corresponding alternating current 60 through the load 10. When the load 10 outputs electrical energy to the full bridge 42 implemented as an H-bridge, then the latter can direct the corresponding power flow back into the submodule 22.

A local control device, referred to in the following as slave 62, is provided in the submodule 22 for actuating the full bridge 42. The slave 62 receives the control signal 36 from the master 34 by way of a protective electrical separation (not shown). On the basis of the control signal 36, the slave 62 derives a first actuation signal 64 for the first switch 46 of the first half-bridge inverter 54, a second actuation signal 66 for the second switch 50 of the first half-bridge inverter 54, a third actuation signal 68 for the first switch 46 of the second half-bridge inverter 56, and a fourth actuation signal 70 for the second switch 50 of the second half-bridge inverter 56, such that on the basis of the battery current 18 the half-bridge inverters 54, 56 output an alternating current 60 through the electrical load 10 having particular characteristics such as frequency and phasing, wherein the characteristics of the alternating current 60 can be changed by the control signal 36. The generation of the actuation signals 64 to 70 can be effected in this situation by means of an open-loop control system or on the basis of a measurement of the alternating current 60 by means of a closed-loop control system.

The slave 62 can furthermore detect a fault in the submodule 22 by means of a voltage 71 dropping at the intermediate circuit capacitor 44. The intermediate circuit capacitor 44 is intended for the storage of electrical energy from the electrical load 10 due to a reactive power flow, which electrical energy cannot leave the submodule 22 due to the predetermined direction of the battery current 18 and the battery voltage 16. The reactive power flow is however limited, which means that the intermediate circuit capacitor voltage 71 is also limited. If the latter exceeds a particular value, then this is accordingly an indication of a faulty electrical energy flow through the submodule 22 because the intermediate circuit capacitor 44 now no longer exclusively stores electrical energy from the reactive power flow but also from an active power flow, which gives an indication that an interruption might possibly be present in the submodule. If on the other hand the intermediate circuit capacitor voltage 71 undershoots a further, smaller predetermined value then this is an indication of a short-circuit to the intermediate circuit capacitor 44.

In both cases the slave 62 can for reasons of safety separate the output of the full bridge 42 from the load 10 in terms of power and optionally in addition short-circuit the input 26, 28 of the submodule 22 in order that the intermediate circuit capacitor 44 does not charge up in uncontrolled fashion.

To this end the slave 62 can firstly short-circuit the output of the full bridge 42 by way of a first safety switch 72, which means that no further inverter voltage 58 can drop at the output of the full bridge 42. If the inverter voltage 58 is zero, then the full bridge 42 can also not accept, or accordingly output, any further electrical power from the electrical load 10. Consequently, charging of the intermediate circuit capacitor 44 by the electrical load 10 is effectively disabled.

In order to prevent currents from being introduced in uncontrolled fashion into the full bridge 42 and being rectified by the free-wheeling diodes 48, 52 in spite of the short-circuit by way of the first safety switch 72, the slave 62 can additionally open a second safety switch 74 which interrupts a still remaining current circuit between the intermediate circuit capacitor 44 and the electrical load 10.

Finally, the slave 62 can additionally or alternatively effect the short-circuit itself by way of full bridge 42. To this end, the first switches 46 of the half-bridge inverters 54, 56 are simply to be closed together and/or the first switches 50 of the half-bridge inverters 54, 56 are simply to be closed together. However, if the full bridge 42 is itself affected by a fault and is no longer able to effectively effect said short-circuit, then the two safety switches 72, 74 constitute a redundant resource for avoiding an overload of the intermediate circuit capacitor 44.

In addition, the slave 62 can also short-circuit the input 26, 28 of the submodule 22. This prevents the intermediate circuit capacitor 44 from being charged up excessively by the battery 8 and from being damaged during the output-side short-circuit. The input-side short-circuit is achieved by closing the second switch 50 of the input half bridge 40.

Although the invention has been illustrated and described in detail by means of the preferred exemplary embodiments, the invention is not restricted by said exemplary embodiments. Other variations can be derived therefrom by the person skilled in the art without departing from the scope of protection of the invention.

What is claimed is:

1. A method for protecting an intermediate circuit capacitor in a power converter circuit having at least two submodules connected in a series circuit and receiving electrical power from a DC power source via an inductance, each submodule having an input side connected to a single-phase half bridge, a full bridge on a load side and a capacitor in an intermediate circuit connected with the bridges, the half bridge, the full bridge and the intermediate circuit capacitor being connected in parallel with one another on the DC voltage side of the power converter circuit, said method comprising:

detecting a fault in one of the submodules, and
   blocking the transmission of electrical power from an output connection on the load side of the full bridge of the faulty submodule into said intermediate circuit capacitor of the faulty submodule.

2. The method of claim 1, wherein transmission of electrical power is blocked by interrupting an electrical connection between the output connection of the faulty submodule and the intermediate circuit capacitor of the faulty submodule.

3. The method of claim 1, wherein transmission of electrical power is blocked by short-circuiting the output connection of the full bridge of the faulty submodule.

4. The method of claim 3, wherein the output of the full bridge of the faulty submodule is short-circuited by closing a switch connected in parallel with the output of the load side of the full bridge of the faulty submodule.

5. The method of claim 1, further comprising blocking the transmission of electrical power from an input of the faulty submodule to the intermediate circuit capacitor of the faulty submodule.

6. The method of claim 5, wherein the transmission of electrical power from the input is blocked by short-circuiting the input of the faulty submodule.

7. The method of claim 1, further comprising detecting the fault in the submodule when a voltage drop across the intermediate circuit capacitor of the faulty submodule exceeds a predetermined value.

8. A method for protecting an intermediate circuit capacitor in a power converter circuit having at least two submodules connected in a series circuit and receiving electrical power from a DC power source via an inductance, each submodule having a single-phase half bridge on an input side, a full bridge on a load side and a capacitor in an intermediate circuit connected with the bridges, the half bridge, the full bridge and the intermediate circuit capacitor being connected in parallel with one another on the DC voltage side of the power converter circuit, said method comprising:
 detecting a fault in one of the submodules, and
 blocking the transmission of electrical power from an output connection of the full bridge of the faulty submodule into said intermediate circuit capacitor of the faulty submodule by short-circuiting the output connection of the full bridge of the faulty submodule, the output connection of the full bridge of the faulty submodule being short-circuited by closing two switches that connect with each other and with the output of the full bridge of the faulty submodule.

9. A control device for a power converter circuit having at least two submodules connected in a series circuit, each submodule having an input side and an output side with a single-phase half bridge connected to the input side of the submodule, a full bridge having an output connected to the load side of the submodule and an intermediate circuit capacitor in an intermediate circuit connected with the bridges, the half bridge, the full bridge and the intermediate circuit capacitor being connected in parallel with one another on the DC voltage side of the submodule, said submodules receiving electrical power from a DC power source via an inductance, said control device comprising:
 a memory; and
 a processor configured to protect the respective intermediate circuit capacitors in the submodules, by detecting a fault in one of the submodules, and blocking transmission of electrical power from an output connection on the load side of the full bridge of the faulty submodule into said intermediate circuit capacitor of the faulty submodule.

10. The control device of claim 9, wherein the processor blocks the transmission of electrical power from an output of the full bridge of the faulty submodule by closing two switches that short-circuit the output of the full bridge that connects the output of the faulty submodule with the intermediate circuit capacitor in the faulty submodule.

11. A power converter circuit, comprising
 at least two submodules connected in a series circuit;
 an inductance, said submodules being adapted to receive electrical power from a DC power source via said inductance, each submodule having a single-phase half bridge connected to its input side, a full bridge connected to its load side, and a capacitor in an intermediate circuit connected with the bridges, the half bridge, the full bridge and the intermediate circuit capacitor being connected in parallel with one another on the DC voltage side of the submodule, and
 a control device comprising a memory and a processor, the processor being configured to protect the intermediate circuit capacitors in the submodules in the power converter circuit by detecting a fault in one of the submodules, and blocking transmission of electrical power from the load-side output of the full bridge of the faulty submodule into said intermediate circuit capacitor of the faulty submodule.

12. The power converter circuit of claim 11, further comprising a switch in each submodule that is connected at a load-side output of the full bridge in series with the full bridge.

13. The power converter circuit of claim 11, further comprising a switch in each submodule that is connected at a load-side output of the full bridge in parallel with the full bridge.

14. The power converter circuit of claim 11, wherein the control device blocks the transmission of electrical power from an output of the full bridge of the faulty submodule by closing two switches that short-circuit the output of the full bridge that connects the output of the faulty submodule with the intermediate circuit capacitor in the faulty submodule.

15. An electric motor installed in a vehicle, the electric motor comprising:
 a plurality of motor windings; and
 a power converter circuit including a plurality of submodules having a one-to-one correspondence with the plurality of motor windings, an output side of each submodule is being connected to a corresponding motor winding, said power converter circuit having at least two submodules connected in a series circuit and receiving electrical power from a DC power source via an inductance, each submodule having an input side connected to a single-phase half bridge and a load side connected to a full bridge, the half bridge, the full bridge and the intermediate circuit capacitor being connected in parallel with one another on the DC voltage side of the power converter circuit, and
 a control device comprising a memory and a processor, the processor being configured to protect the intermediate circuit capacitors in the submodules in the power converter circuit by detecting a fault in one of the submodules, and blocking transmission of electrical power from the load-side output of the full bridge of the faulty submodule into said intermediate circuit capacitor of the faulty submodule.

16. The electric motor of claim 15, further comprising a switch in each submodule that is connected at an output of the full bridge in series with the full bridge.

17. The electric motor of claim 15, further comprising a switch in each submodule that is connected at an output of the full bridge in parallel with the full bridge.

18. The electric motor of claim 15, wherein the control device blocks the transmission of electrical power from an output connection on the load side of the full bridge of the faulty submodule by closing two switches that short-circuit the load-side output of the full bridge that connects the load-side output with the intermediate circuit capacitor in the faulty submodule.

* * * * *